United States Patent [19]

Maietta

[11] Patent Number: 5,775,167
[45] Date of Patent: Jul. 7, 1998

[54] FINGER OPERATED THROTTLE LEVER

[76] Inventor: Neil R. Maietta, P.O. Box 1025, Gray, Me. 04039

[21] Appl. No.: 712,584

[22] Filed: Sep. 13, 1996

[51] Int. Cl.$^6$ .................................................. G05G 11/00
[52] U.S. Cl. ........................................ 74/480 R; 74/489
[58] Field of Search ........................... 74/480 R, 489, 74/523, 551.8; 180/335

[56] References Cited

FOREIGN PATENT DOCUMENTS

| 340315 | 12/1930 | United Kingdom | 74/489 |
| 792769 | 4/1958 | United Kingdom | 74/489 |

*Primary Examiner*—Charles A. Marmor
*Assistant Examiner*—Troy Grabow
*Attorney, Agent, or Firm*—William B. Ritchie

[57] ABSTRACT

A finger operated throttle control lever for snowmobiles and other vehicles which is a secondary acceleration device to the primary thumb throttle. A finger operated lever mechanism, the motion of which, compels the motion of a thumb throttle, where by, depressing the finger throttle causes the thumb throttle to depress and normal acceleration to occur. When the operators throttle thumb becomes tired, the finger throttle is used to continue riding while resting the thumb.

6 Claims, 6 Drawing Sheets

FINGER OPERATED THROTTLE LEVER

BACKGROUND OF THE INVENTION

1. Field of the Invention

The invention relates to throttles for vehicles, such as, snowmobiles, in particular, safety devices.

2. Description of the Related Art

As is very commonly known, gasoline powered engines used in vehicles, such as snowmobiles, have a throttle mechanism which controls the speed of the vehicle by regulating the amount of gas entering the cylinders depending on the setting of the operator controlled variable throttle lever device located on the handle bar. The variable throttle device is thumb controlled and remote to the engine throttle mechanism. The remote throttle lever is connected to the engine throttle mechanism via a flexible cable. The throttle mechanism has a relatively powerful spring which opposes the operator controlled thumb throttle across its entire variable speed range. The opposing spring force must be overcome by the operators thumb which places unusual stresses on the thumb muscles. The prolonged unusual stress causes fatigue and operator discomfort after a short period of time. If total rest is not provided for the thumb muscles the operator will attempt to partially rest the thumb by depressing the thumb throttle with portions of the hand that the thumb throttle was not designed to function with. This hand twisting causes loss of steering control and very poor speed control.

U.S. Pat. No. 4,899,610, issued to Bourret on Feb. 13, 1990, recognized this problem and attempted to remedy it by developing a two stage thumb throttle where the first stage requires less thumb effort than normal to operate the vehicle at cruising speeds, but more thumb effort than normal to operate the vehicle at high speeds. While this system may provide some slowdown in the onset of thumb fatigue, it will still occur. This system cannot eliminate thumb fatigue by providing total rest of the thumb.

U.S. Pat. No. 4,619, 341, issued to Davis on Oct. 28, 1986, discloses a second thumb throttle. The inventor's intent was to provide a racing accessory to enable an operator to have a second throttle option when turning corners at high speeds. Should the operator loose his grip on the primary throttle and desire to continue to accelerate he would be able to reach a second throttle to do so. This throttle arrangement is potentially confusing to the typical rider since the throttle is on the right handlebar and the brake is on the left handlebar. If an operator had to stop quickly, the left hand may squeeze the throttle lever rather than the brake lever, or both. This device is expensive and difficult to install.

SUMMARY OF THE INVENTION

The purpose of the present invention is to provide in a vehicle, such as a snowmobile, with a pair of handle bars for steering, a second acceleration lever to operate with fingers if the muscles in the throttle thumb become fatigued and need a rest. The invention is based on the fact that throttle thumb fatigue occurs during extended vehicle operation, such as snowmobiling, and the only way to effectively remedy the fatigue is to totally rest the thumb for intermittent intervals of time throughout the period of vehicle operation. This invention furnishes the operator with a way of resting a tired thumb while continuing to operate the vehicle.

The invention provides in a vehicle, such as a snowmobile, with a pivotally mounted thumb throttle located adjacent to the handgrips, a second throttle device which is finger controlled. The finger throttle is in close proximity to the handgrip and can be actuated without moving the operator's hand from the normal handgrip location.

When the operator desires to use the finger throttle in place of the thumb throttle, the thumb is removed from the thumb throttle and wrapped around the handgrip. The fingers are then extended to the finger throttle and it is pulled from the home position to the handgrip until the fulcrum touches the handgrip. If the finger throttle is pulled beyond the point where the fulcrum first touched the handgrip, acceleration will occur. When the finger throttle is no longer used it automatically springs back to the home position and clears the handgrip for full finger engagement to the handgrip.

The finger throttle is a lever with a fulcrum located at a point to provide a high mechanical advantage, which reduces the effect of the throttle mechanism spring on the finger muscles. The finger throttle is physically attached to the thumb throttle in a manner where by pulling the finger throttle toward the handgrip causes the thumb throttle to move toward the handgrip in a proportional manner. The finger throttle accomplished this with special metal brackets which link the two throttle levers together while maintaining the original factory thumb throttle location and pivot point. The connecting point where the finger throttle connects to the metal brackets moves in an arc around the thumb throttle pivot point. This arc causes the finger throttle fulcrum to move parallel to the handgrip. If the fulcrum was allowed to repeatedly slide on the handgrip, most of which are electrically heated, an abrasion caused failure of the heated handgrip would occur. A fulcrum wheel was designed into the lever to eliminate abrasion failures and to provide smooth finger throttle operation.

It is an object of the invention to provide a finger operated throttle lever which can be used if the operators throttle thumb becomes tired and needs a rest.

It is an object of the invention to provide a finger operated throttle lever which automatically returns to a home position when not in use.

It is an object of the invention to provide a finger operated throttle lever which improves operator safety by eliminating the need to improperly use the thumb throttle while trying to rest the thumb.

It is an object of the invention to provide a finger operated throttle lever which does not alter any factory designed throttle mechanisms, cables, or linkages.

It is an object of the invention to provide a finger operated throttle lever which has a wheel for a fulcrum that will not damage electrically heated handgrips.

It is an object of the invention to provide a finger operated throttle lever which generally limits the capability of the vehicle to cruising speeds, but can be operated at full speed if desired.

It is an object of the invention to provide a finger operated throttle lever which provides a new and improved throttle control device for vehicles such as snowmobiles.

It is an object of the invention to provide a finger operated throttle lever which is inexpensive to purchase, easy to install, easy to use, and effective in reducing operator throttle fatigue.

Further objects and advantages of this invention will become apparent from a consideration of the drawings and ensuing description.

DETAILED DESCRIPTION OF THE INVENTION

Figure 1:
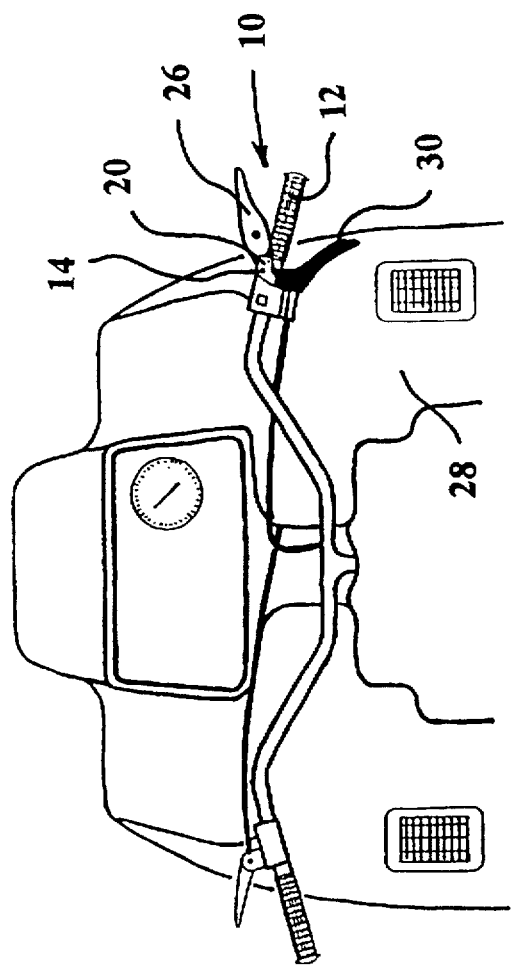
FIG. 1 is a view of the invention installed on a typical snowmobile.
Figure 3:
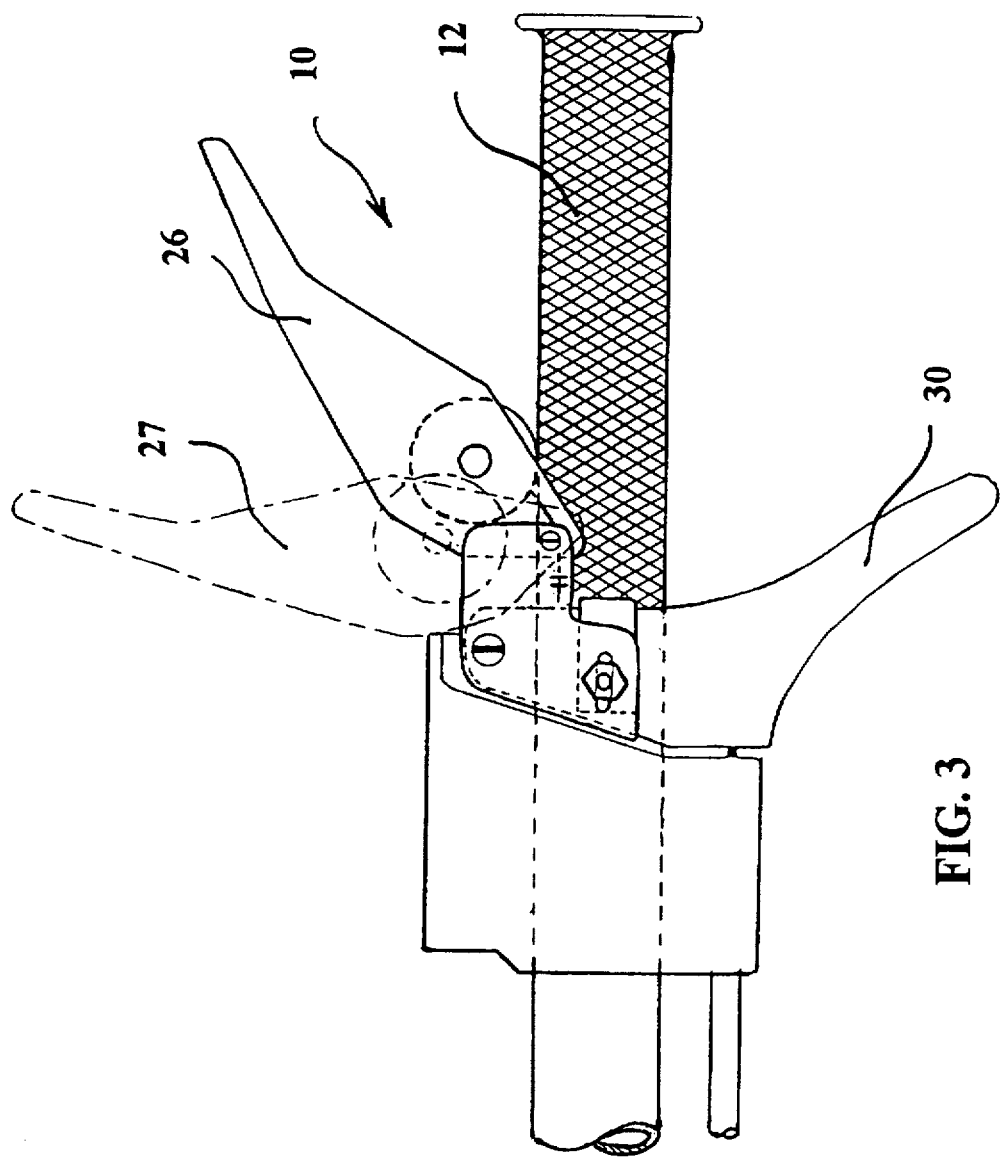
FIG. 3 is a side view of the invention showing the finger throttle in the home position.

FIG. 1 shows the invention 10 mounted to the handgrip 12 of a snowmobile 28. In FIG. 1, the invention 10 is mounted onto the thumb throttle 30 in the customary right handgrip 12 location of a handlebar steered vehicle 28. The invention 10 is in close enough proximity to the handgrip 12 that the fingers can reach the finger throttle lever 26 while finger throttle lever 26 is in the home position 27, as shown in FIG. 3. For most riders, this means when their throttle thumb becomes tired and needs a rest they can reach with their fingers, while maintaining engine speed, to the finger throttle lever 27 in the home position and begin using it while at the same time discontinuing to use the thumb throttle 30.

Figure 2:
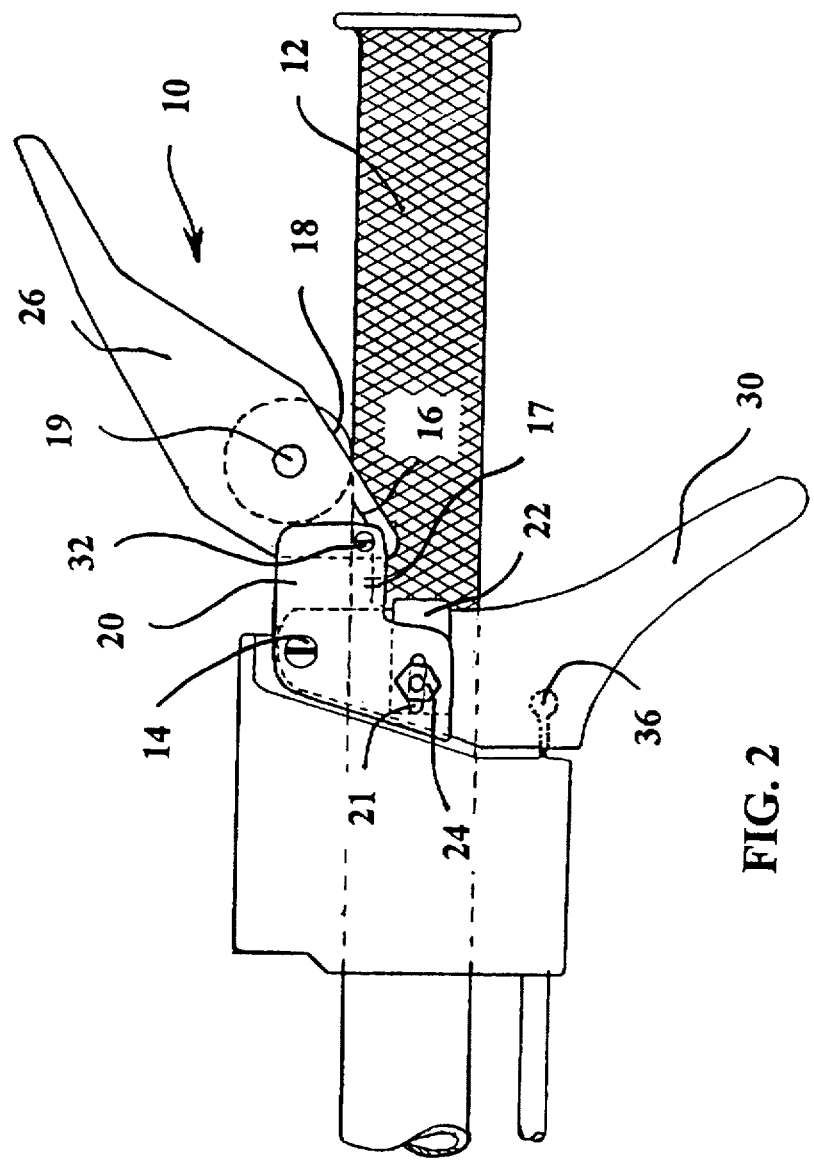
FIG. 2 is a side view of the invention.

In FIG. 2, the invention 10 is mounted and in position to be used. When a force is applied to the finger throttle 26, moving it toward the handgrip 12, the fulcrum wheel 18, mounted on an axle 19, causes the load side of the finger throttle 26 to move away from the handgrip 12. The load side of the finger throttle 26 is attached to the connecting lever bracket 20 with load side pivot screws 32. When the load side of the finger throttle 26 moves away from the handgrip 12 the force side of the connecting lever bracket 20 moves away with it. The connecting lever bracket 20 pivots at the thumb throttle pivot point 14 which causes the load side of the connecting lever bracket 20 to move in the same direction as the thumb throttle 30. Since the load side of the connecting lever bracket 20 is attached to the thumb throttle 30, this sequence of finger initiated events causes the thumb throttle 30 to move in the same manner as it would if it were moved using the thumb. This double lever action is what enables the finger throttle to move the thumb throttle without altering any of the original equipment manufacturer's throttle mechanisms, cables, or linkages.

Figure 4:
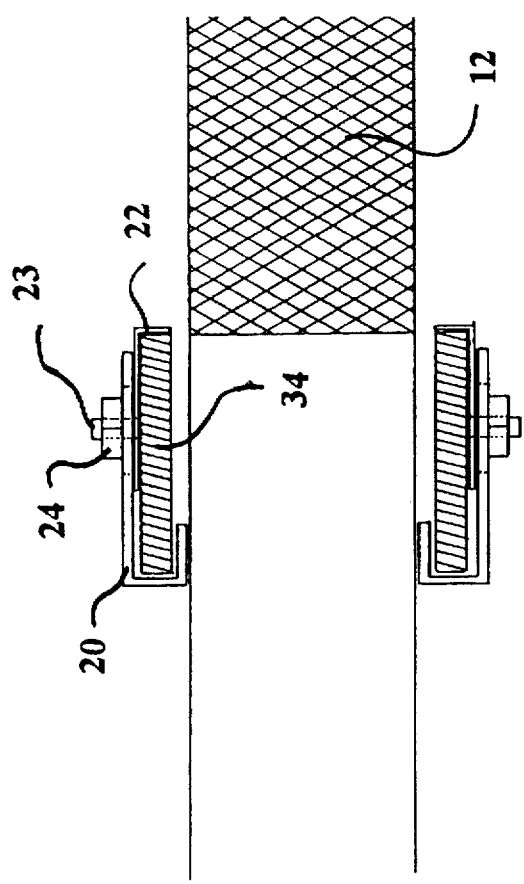
FIG. 4 is a bottom view of invention showing the clamping mechanism that connects the lever bracket to the thumb throttle.

In FIG. 4, the mechanism of attaching the connecting lever bracket 20 to the thumb throttle 30 is illustrated. Each connecting lever bracket 20 has a grasping tab that is formed first by bending a tab toward the handgrip 12 and then making a second bend running parallel to the handgrip 12. This double bend enables the tab of the connecting lever bracket 20 to wrap itself around the thumb throttle 30. To ensure the tab stays securely in place, an adjusting clamp 22 is firmly forced toward the opposite side of the thumb throttle leg 34 and locked in place by tightening the lock nut 24. The adjusting clamp 22 has a stud 23 attached to it which the lock nut 24 is screwed onto. The stud 23 is positioned in the connecting lever bracket 20 through a slotted hole 21 which makes the adjusting clamp 22 adjustable. The relative position of the connecting lever bracket 20, with the adjusting clamp 22 firmly locked in place, is maintained by the insertion of the thumb throttle pivot point pin 14. To maintain a balanced lever action, a connecting lever bracket assembly is attached to each thumb throttle leg 34 and corresponding finger throttle 26 load side connecting point.

Figure 5:
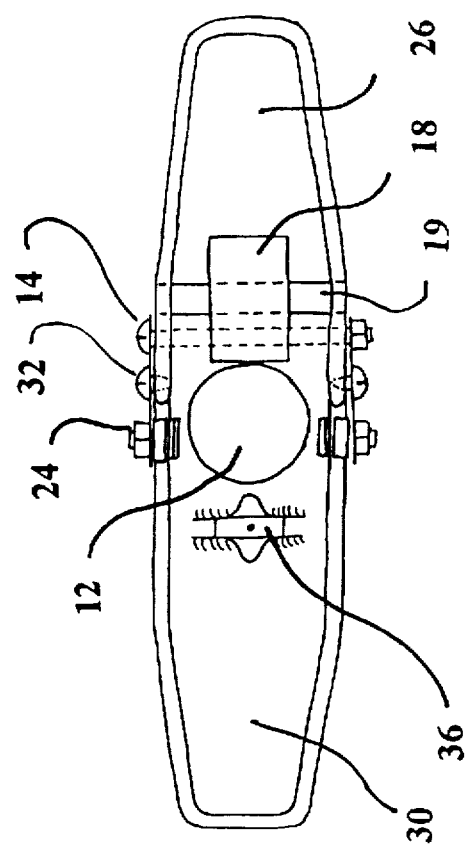
FIG. 5 is an end view of the invention mounted on a typical handgrip.

FIG. 5 is an end view of the invention mounted on a typical handgrip, showing the relationship of the invention 10 and attached thumb throttle 30 to the handgrip 12. All attaching hardware is free from interference with the handgrip. The flexible throttle cable end 36 remains where the manufacturer designed it to be attached to the thumb throttle 30. The thumb throttle 30 location and pivot point, relative to the handgrip 12, remain as the manufacturer designed it to be.

Figure 6:
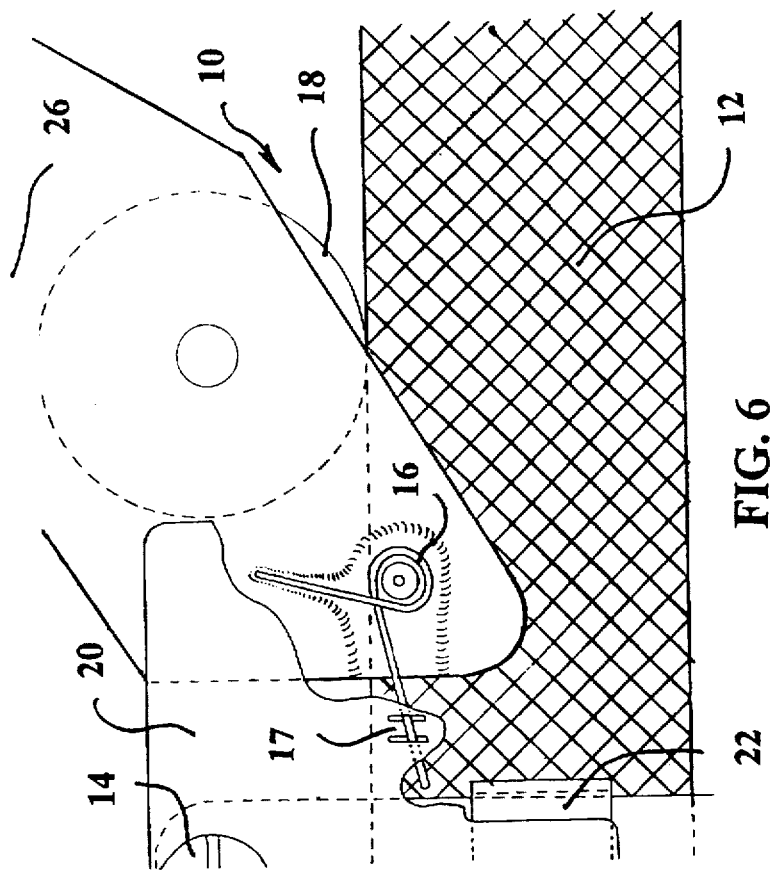
FIG. 6 is a detailed view of the internal springs used to return the finger throttle to the home position.

FIG. 6 is a detailed view of the internal springs used to return the finger throttle to the home position. The relative position of the torsion spring 16 to the connecting lever bracket 20 and the load side of the finger throttle 26 is shown. A multiple wound, straight legged, torsion spring 16, the coil of which, is held in position around a protruding boss on the load side of the finger throttle 26. The first leg of the spring 16 rests in a slot in the load side of the finger throttle. The second leg of the spring 16 is attached to the connecting lever bracket 20 by inserting the leg through a pierce and form slot 17. The torsion spring 16 is formed in a manner which provides approximately one quarter turn of reserve force to the finger throttle 26 when it is in the home position. This ensures the finger throttle 26 stays home when not in use even if there is some loss in spring memory.

OPERATION OF THE INVENTION

As shown in FIG. 3., the thumb throttle 30 and finger throttle 26 are in the closed throttle condition of the mechanism. The thumb throttle 30 is being held in the position shown by the spring load of the throttle mechanism closing force acting on the flexible throttle cable end 36. To open the throttle the driver of the vehicle engages the thumb throttle 30 with the thumb of the hand which encloses the handgrip 12, i.e. the right hand. The thumb throttle 30 is positioned closely adjacent to the handgrip 12 so that it can easily be manipulated by the thumb while the handgrip 12 is enclosed by the fingers of the right hand.

If the operator's throttle thumb becomes tired and needs a rest, the fingers are extended to the finger throttle 27 in the home position and it is pulled to the handgrip 12. With the thumb wrapped around the handgrip 12 the finger throttle 26 is pulled past the fulcrum wheel 18 toward the handgrip 12 and acceleration occurs. Due to the axis the connecting lever bracket 20 rotates about the thumb throttle pivot point 14, and the resulting longitudinal movement of the finger throttle 26, a fulcrum wheel 18 was designed into the finger throttle 26 rather than a fixed fulcrum. The fulcrum wheel 18 eliminates any abrasion of the heated handgrip 12 and prevents finger throttle 26 induced failures of the handgrips 12. When the thumb is rested and the finger throttle 26 is no longer needed it returns to the home position upon release of the fingers. This will clear the handgrip 12 for full finger engagement when the thumb throttle 30 is used.

A goal of the present invention was to develop a way of actuating the thumb throttle 30 without using your thumb to do so, and without altering any factory throttle mechanism, cables, or linkages. This was accomplished by two levers connected together serially, one of which is acted upon by the fingers and the other acts upon the thumb throttle 30. This arrangement allows the operator, while resting a tired thumb, to make the thumb throttle 30 operate remotely through an alternate finger throttle 26.

When using the finger throttle 26, the thumb is wrapped around the handgrip 12. Pulling the finger throttle 26 toward the handgrip 12 moves, proportionally, the thumb throttle toward the handgrip 12. Since the thumb is resting on the hand grip, the thumb throttle can move only about half of its full travel before hitting it. This limits the speed of the vehicle to about half speed. Since thumb fatigue occurs during long trail rides where vehicle speed usually ranges from near zero to half speed, thumb interference is not a factor in thumb throttle 26 performance. If greater speed is desired the thumb can be moved to the end of the handgrip 12, avoiding interference and achieving full speed, or the operator can simply switch back to the thumb throttle 30.

The invention provides fatigue control, thereby improves the enjoyment of operating vehicles, such as snowmobiles, for extended periods of time. Presently, if a rider is traveling with a group on a long trail ride and his/her throttle thumb becomes tired, there is no way to rest it, short of stopping the vehicle.

The convenient location provides an additional safety benefit by allowing the operator to easily switch back and forth between throttle devices while maintaining good steering and acceleration control.

While there have been described what are at present considered to be the preferred embodiments of this invention, it will be obvious to those skilled in the art that various changes and modifications may be made therein without departing from the invention and it is, therefore, aimed to cover all such changes and modifications as fall within the true spirit and scope of the invention.

What is claimed is:

1. A throttle apparatus for a vehicle comprising handgrips; a thumb throttle associated with one of said grips, said thumb throttle having at least one thumb throttle pivot point; and a finger throttle comprising:

a finger operated member having a pivot end, a force end and having a home position;

a fulcrum attached to said finger operated member disposed between the pivot end and the force end of said finger operated member, wherein the home position is provided when said fulcrum is away from said handgrip so that a user's hand may grip the handgrip clear of said finger operated member and the user's thumb may operate said thumb throttle in a normal manner;

a finger throttle pivot point adjacent to the pivot end of said finger operated member, wherein said finger operated member is pivotally attached via said finger throttle pivot point to said thumb throttle with said finger throttle pivot point being a predetermined distance from the thumb throttle pivot point; wherein the user can operate said finger operated member to rest the user's thumb by moving said finger operated member from the home position such that said fulcrum is in contact with said handgrip, wherein movement of said finger operated member causes said thumb throttle to move accordingly, thus regulating the speed of said vehicle.

2. The finger throttle of claim 1 wherein said finger throttle pivot point is directly connected to said thumb throttle.

3. The finger throttle of claim 1 further comprising a connecting member rigidly attached to said thumb throttle wherein said finger throttle pivot point is pivotally attached to said connecting member.

4. The finger throttle of claim 3 further comprising a pivot point extension member which is attached to said finger operated member, said pivot point extension member further comprising an extension finger throttle pivot point such that said finger operated member is connected to said connecting member via said extension finger throttle pivot point.

5. The finger throttle of claim 1 further comprising a spring which urges said finger operated member away from said handgrip thus providing the home position when the user releases said finger operated member.

6. The finger throttle of claim 1 wherein said fulcrum comprises a wheel.

* * * * *